(12) United States Patent
Hu et al.

(10) Patent No.: US 12,501,895 B2
(45) Date of Patent: Dec. 23, 2025

(54) COMPOSITION FOR CRYOPRESERVATION OF MYOCARDIAL CELLS

(71) Applicant: BEIJING BAHEAL WISART MEDICAL RESEARCH CO., LTD, Beijing (CN)

(72) Inventors: Shengshou Hu, Beijing (CN); Bingying Zhou, Beijing (CN); Yongfeng Hou, Beijing (CN); Xun Shi, Beijing (CN); Xiaoli Tang, Beijing (CN)

(73) Assignee: BEIJING BAHEAL WISART MEDICAL RESEARCH CO., LTD., Beijing (CN)

(*) Notice: Subject to any disclaimer, the term of this patent is extended or adjusted under 35 U.S.C. 154(b) by 647 days.

(21) Appl. No.: 17/995,409

(22) PCT Filed: Mar. 12, 2021

(86) PCT No.: PCT/CN2021/080535
§ 371 (c)(1),
(2) Date: Oct. 4, 2022

(87) PCT Pub. No.: WO2021/203911
PCT Pub. Date: Oct. 14, 2021

(65) Prior Publication Data
US 2023/0189794 A1    Jun. 22, 2023

(30) Foreign Application Priority Data
Apr. 9, 2020   (WO) ............... PCT/CN2020/083872

(51) Int. Cl.
*A01N 1/162*   (2025.01)
*A01N 1/125*   (2025.01)
*C12N 5/077*   (2010.01)

(52) U.S. Cl.
CPC ............. *A01N 1/162* (2025.01); *A01N 1/125* (2025.01); *C12N 5/0657* (2013.01)

(58) Field of Classification Search
None
See application file for complete search history.

(56) References Cited

U.S. PATENT DOCUMENTS

2011/0008763 A1 * 1/2011 Lee ................. A01N 1/125
435/1.2
2015/0191697 A1   7/2015 Stankewicz et al.

FOREIGN PATENT DOCUMENTS

CN   103201377 A   7/2013
CN   107636149 A   1/2018
(Continued)

OTHER PUBLICATIONS

Abi-Gerges et al. Preservation of cardiomyocytes from the adult heart. Journal of Molecular and Cellular Cardiology 64 (2013) 108-119. (Year: 2013).*
(Continued)

*Primary Examiner* — Jeffrey S Lundgren
*Assistant Examiner* — Sara Elizabeth Townsley
(74) *Attorney, Agent, or Firm* — Synergy IP Group AG; Lily Ackerman

(57) ABSTRACT

The present invention relates to a composition for the cryopreservation of myocardial cells, the composition comprising BLEB and/or PAB (or a physiologically acceptable salt thereof) and an antifreeze agent. The present invention further relates to a myocardial cell cryopreservation kit containing the composition, a method for the cryopreservation of mammal myocardial cells by means of using the composition above, and the use of the composition above in the preparation of a reagent for the cryopreservation of mammal myocardial cells.

3 Claims, 2 Drawing Sheets

(56) References Cited

FOREIGN PATENT DOCUMENTS

| EP | 3967751 A1 | 3/2022 | | |
|---|---|---|---|---|
| WO | 2012062819 A2 | 5/2012 | | |
| WO | 2019144968 A1 | 8/2019 | | |
| WO | WO-2020096995 A1 | * | 5/2020 | ............ A01N 1/125 |
| WO | WO-2020223125 A1 | * | 11/2020 | ............ A01N 1/125 |

OTHER PUBLICATIONS

Rauscher et al. Targeting Myosin by Blebbistatin Derivatives: Optimization and Pharmacological Potential. Trends in Biochemical Sciences, vol. 43, No. 9, pp. 1-14 (2018)). (Year: 2018).*
Voigt et al. Methods for isolating atrial cells from large mammals and humans. Journal of Molecular and Cellular Cardiology 86, 187-198 (2015). (Year: 2015).*
International Search Report of International Application No. PCT/CN2021/080535, May 26, 2021, 8 pages.
Delaughter, D. M. , et al., "Single-Cell Resolution of Temporal Gene Expression During Heart Development", Dev Cell. 2016, vol. 39, Nov. 21, 2016, 25 pages.
Farman, G.P. , et al., "Blebbistatin: use as inhibitor of muscle contraction", Pflugers Archiv-European Journal of Physiology, vol. 455, No. 6, Nov. 10, 2007, pp. 995-1005.
Guo, Guang-Ran , et al., "A modified method for isolation of human cardiomyocytes to model cardiac diseases", Journal of Translational Medicine, vol. 16, 2018, pp. 1-9.
Hu, Shengshou , et al., "Summary of Report on Cardiovascular Diseases in China 2018", Chinese Circulation Journal Mar. 2019, vol. 34 No. 3, 2019, pp. 209-220.
Kabaeva, Zhyldyz , et al., "Blebbistatin extends culture life of adult mouse cardiac myocytes and allows efficient and stable transgene expression", American Journal of Physiology—Heart and Circulatory Physiology, vol. 294, No. 4, Feb. 22, 2008, pp. H1667-H1674.
Lovelock, JE , et al., "Prevention of freezing damage to living cells by dimethyl sulphoxide", Nature, vol. 183, May 16, 1959, pp. 1394-1395.
Meryman, Harold T. , "Cryopreservation of living cells: principles and practice", Transfusion, vol. 47, May 2007, pp. 935-945.
Rauscher, Anna Á., et al., "Targeting Myosin by Blebbistatin Derivatives: Optimization and Pharmacological Potential", Trends in Biochemical Sciences, vol. 43, No. 9, Sep. 30, 2018, pp. 1-14.
Várkuti, Boglárka H., et al., "A highly soluble, non-phototoxic, non-fluorescent blebbistatin derivative", Sci. Rep., vol. 6, May 31, 2016, pp. 1-10.
Voigt, Niels , et al., "Methods for isolating atrial cells from large mammals and humans", Journal of Molecular and Cellular Cardiology, vol. 86, 2015, pp. 187-198.
Yang, Xiulan , et al., "Engineering Adolescence: Maturation of Human Pluripotent Stem Cell-Derived Cardiomyocytes", NIH Public Access, Circ Res. 2014, , vol. 114, Jan. 31, 2014, 29 pages.
Extended European Search Report issued in EP21783704.6, Apr. 15, 2024, 9 pages.
Chung, et al., "Myocyte contractility can be maintained by storing cells with the myosin ATPase inhibitor 2,3 butanedione monoxime", Physiological Reports, vol. 3, No. 6, Jun. 1, 2015, 9 pages.
Callaghan, et al., "Long-term, functional culture and in vitro manipulation of adult mouse cardiomyocytes", bioRxiv, Aug. 1, 2019, 20 pages.
Yokomuro, et al., "Effect of Cryopreservation on Cell Proliferation and Immunogenicity of Transplanted Human Heart Cells", Ann Thorac Cardiovasc Surg, vol. 16, No. 2, 2010, pp. 105-112.
Karnieli, O., "Stem Cell Manufacturing", Chapter 6, Bioreactors and Downstream Processing for Stem Cell Manufacturing, Elsevier B.V., 2016, p. 157.

* cited by examiner

COMPOSITION FOR CRYOPRESERVATION OF MYOCARDIAL CELLS

CROSS REFERENCE TO RELATED APPLICATIONS

This application is a United States National Stage Application filed under 35 U.S.C. § 371 claiming the benefit of PCT Application No. PCT/CN2021/080535, filed on Mar. 12, 2021, which claims priority to and the benefit of PCT Application No. PCT/CN2020/083872, filed on Apr. 9, 2020, all of which are hereby incorporated herein by reference in their entireties.

BACKGROUND

The scientific research project involved in this application is a medicine and health technology innovation project of the Chinese Academy of Medical Sciences, with the project number of 2017-I2M-1-003.

TECHNICAL FIELD

The present invention relates to a composition for the cryopreservation of cardiomyocytes, the composition comprising BLEB and/or PAB (or a physiologically acceptable salt thereof) and a cryoprotective agent. The present invention further relates to a cardiomyocyte cryopreservation kit comprising the composition, a method for the cryopreservation of mammalian cardiomyocytes using the composition above, and use of the composition above in the preparation of a reagent for the cryopreservation of mammalian cardiomyocytes.

DESCRIPTION OF RELATED ART

Deaths caused by cardiovascular diseases account for over 40% of total disease-related mortality, surpassing tumors and other diseases. As such, cardiovascular diseases are the number one killer globally. According to the *Report on Cardiovascular Diseases in China* 2018, the prevalence of cardiovascular diseases in China continues to rise, and the mortality rate still ranks first, higher than tumors and other diseases (non-patent document 1). Therefore, research into the prevention and treatment of cardiovascular diseases is critical to human health.

However, there has been no breakthrough in the research of pathological mechanism and the research and development of new drugs in the cardiovascular field for many years, little progress has been made in the drug therapy of traditional cardiovascular diseases, and clinical trials of myocardial protective drugs have also failed frequently. One of the main reasons for the above phenomena is the limitation of cell models used in clinical research.

To study the prevention and treatment of any kind of disease, it is necessary to have a good cell model. Mammalian, especially human, cardiomyocytes are important cellular models in cardiovascular research. However, unlike other somatic cells, cardiomyocytes themselves have the characteristics of strong locomotion and high oxygen consumption, such that they need to consume a lot of energy and produce a lot of metabolites for survival, making it difficult to dissociate and store them for future use. Although it is theoretically possible to obtain cardiomyocytes through the directed differentiation of human embryonic stem cells or induced pluripotent stem cells, this method has some problems such as incomplete differentiation and lack of patient-specific epigenetic modifications (non-patent documents 2 and 3), thus failing to reflect the true state of diseases faithfully. Therefore, primary cardiomyocytes that are isolated from the adult heart are still ideal cell models, except that, currently, they can only be used acutely. This poses a problem particularly for the acquisition and use of human primary cardiomyocytes. While animal cells can be obtained upon need, human specimens have to be acquired during surgery, which often does not match the experimental schedule. Sometimes, different samples need to be processed in parallel to negate batch effects, and therefore requires storage for synchronization for experimentation. In other cases, freshly isolated cardiomyocytes cannot be used up immediately. Hence, without a method to preserve these precious samples for future use, all these types of materials would be wasted, exacerbating shortage of human primary cardiomyocytes.

Currently, there is no successful example of the cryopreservation of adult primary cardiomyocytes, let alone human ones. Compared with other species, human cardiomyocytes are even less tolerant to ischemia and hypoxia, which means that the cryopreservation and resuscitation of human cardiomyocytes is more difficult than that of other species. Once the cryopreservation and resuscitation process is not handled properly, apoptosis or necrosis may even occur in just a few minutes.

In order to solve the above-mentioned practical problems and ensure an adequate supply of cardiomyocytes for clinical research and new drug development of cardiovascular disease-related drugs, it is necessary to develop an efficient method for the cryopreservation of mammal, especially human, cardiomyocytes, and to develop a corresponding cryopreservation composition (e.g., a cryopreservation reagent), so as to make the recovery and utilization of mammal, especially human, cardiomyocytes possible, saving precious resources.

For ordinary cells, the cryopreservation and resuscitation of cells is a "slow-freezing and quick-thawing" process. On the one hand, the cryopreservation of cells requires "slow-freezing". If the temperature of cells suddenly drops below zero, the organelles will be dehydrated, and the concentration of soluble substances in the cells will increase, forming ice crystals in the cells, causing damage to the cells. However, the cells can be dehydrated slowly by cooling and cryopreservation with a slow gradient, and large ice crystals will not be generated in the cells. In addition, a cryoprotective agent (e.g., ficoll, dextrans, and the like) can be added to the cryopreservation reagent, so as to lower the freezing point, reduce the formation of intracellular ice crystals, and reduce the concentration of electrolytes in the unfrozen solution by binding the cryoprotective agent with water molecules in the solution, thereby inhibiting damage to the cells and making the cryopreservation of the cells possible. At present, cryoprotective agents commonly used include polyvinyl pyrrolidone (PVP), ficoll, some dextrans, and the like. On the other hand, the resuscitation of cells should be "quick-thawing", which can ensure that the extracellular crystals are thawed in a very short time, and avoid damage to the cells due to slow thawing and infiltration of moisture into cells to cause intracellular recrystallization (non-patent documents 4 and 5).

However, the foregoing is only a general theory for the cryopreservation and resuscitation of ordinary somatic cells. For cardiomyocytes, especially human cardiomyocytes, there is no technology in the prior art that can cryopreserve and resuscitate cells with high survival rate and maintain cell morphology, which seriously hinders the development of relevant scientific research, and fails to meet the needs of providing a research basis for clinical disease diagnosis and treatment.

RELATED DOCUMENTS

Non-patent document 1: H U Shengshou, G A O Runlin, L I U Lisheng, et al., Summary of *Report on Cardiovascular Diseases in China* 2018, Chinese Circulation Journal, 2019, 34(3): 209-220.

Non-patent document 2: D. M. DeLaughter, A. G. Bick, H. Wakimoto, D. McKean, J. M. Gorham, I. S. Kathiriya, J. T. Hinson, J. Homsy, J. Gray, W. Pu, B. G. Bruneau, J. G. Seidman, and C. E. Seidman, "Single-Cell Resolution of Temporal Gene Expression During Heart Development", *Dev Cell*, 39 (2016), 480-90.

Non-patent document 3: X. Yang, L. Pabon, and C. E. Murry, "Engineering Adolescence: Maturation of Human Pluripotent Stem Cell-Derived Cardiomyocytes", *Circ Res*, 114 (2014), 511-23.

Non-patent document 4: LOVELOCK J E, BISHOP M W "Prevention of freezing damage to living cells by dimethyl sulphoxide", *Nature*. 1959 May 16; 183 (4672):1394-5.

Non-patent document 5: Meryman H T, "Cryopreservation of living cells: principles and practice", *Transfusion*, 2007 May; 47(5):935-45.

BRIEF SUMMARY OF THE INVENTION

In consideration of the actual clinical needs and the characteristics of human cardiomyocytes, the inventors of this application have conducted in-depth research and continuous optimization on the cryopreservation technology of human cardiomyocytes and related reagents in order to solve the problem of cryopreservation and resuscitation of human cardiomyocytes, thus developing a composition for the cryopreservation of cardiomyocytes.

Therefore, the present invention includes, but is not limited to, the following technical contents:

1. A composition, comprising BLEB and/or PAB or a physiologically acceptable salt thereof, and a cryoprotective agent

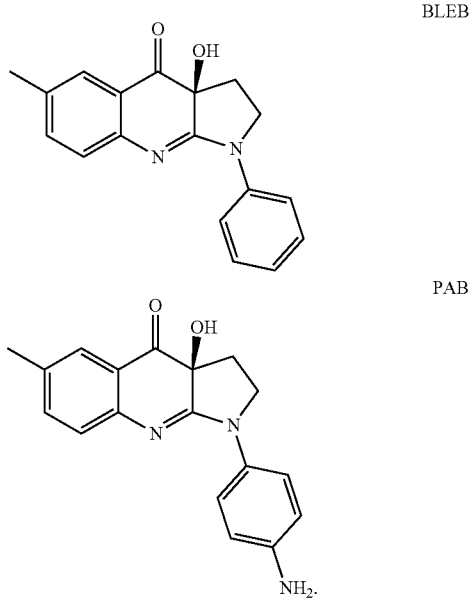

2. The composition of technical item 1, further comprising one or more components selected from the group consisting of an energy component, a metabolic regulator, an acid-base regulator, and an isotonic agent.

3. The composition of any of the preceding technical items, comprising the following components: BLEB and/or PAB or a physiologically acceptable salt thereof, hydroxyethyl starch, DMSO, glucose, creatine, adenosine, allopurinol, reduced glutathione, taurine, 4-hydroxyethyl piperazine ethanesulfonic acid, magnesium sulfate, potassium dihydrogen phosphate, and calcium chloride.

4. The composition of any of the preceding technical items, comprising the following components: 1 to 50 µM BLEB or 1 to 100 µM PAB, as well as 20 to 100 mg/ml hydroxyethyl starch, 1 to 30 vol % DMSO, 5 to 50 mM glucose, 0.5 to 20 mM creatine, 0.1 to 20 mM adenosine, 0.1 to 5 mM allopurinol, 0.5 to 10 mM reduced glutathione, 5 to 50 mM taurine, 0.5 to 10 mM 4-hydroxyethyl piperazine ethanesulfonic acid, 1 to 20 mM magnesium sulfate, 5 to 100 mM potassium dihydrogen phosphate, and 0.5 to 5 mM calcium chloride.

5. The composition of any of the preceding technical items, having a pH value of 7.0 to 7.8.

6. A cardiomyocyte cryopreservation kit, comprising the composition of any of technical items 1 to 5.

7. A method for the cryopreservation of mammalian cardiomyocytes using the composition of any of technical items 1 to 5.

8. The method of technical item 7, wherein the mammal is a human being.

9. Use of the composition of any of technical items 1 to 5 in the preparation of a reagent for the cryopreservation of mammalian cardiomyocytes.

10. The use of technical item 9, wherein the mammal is a human being.

By using the composition of the present invention, mammalian cardiomyocytes can be efficiently cryopreserved and resuscitated, and the cryopreserved and resuscitated cells can still maintain ideal survival rate and morphology. In particular, by using the composition of the present invention, the resuscitation of human cardiomyocytes after cryopreservation is achieved for the first time, and good survival rate and cell morphology are obtained after resuscitation. Thus, the present invention can provide a solid foundation for cardiovascular disease research, clinical transformation, drug research and development as well as individualized treatment.

DETAILED DESCRIPTION OF EMBODIMENTS

Figure 1:
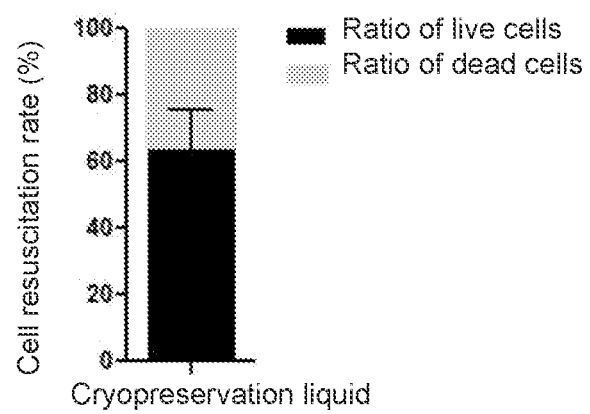
FIG. 1 shows the resuscitation rate of cardiomyocytes after the cryopreservation and resuscitation operations in Examples 1 to 2.

The inventors of this application have conducted a large number of extensive and in-depth researches, conducted a large number of experiments and explorations, and unexpectedly found that BLEB or its derivative PAB can well solve the technical problems to be solved by the present invention.

BLEB, also known as "(−)-Blebbistatin", is an inhibitor of non-muscle myosin II and a cell-permeable inhibitor known to inhibit the contraction of mouse cardiomyocytes; and in addition, BLEB has been widely used as a specific uncoupling agent in cardiovascular physiology research. PAB, also known as "para-aminoblebbistatin", is a derivative of BLEB with similar structure and properties to BLEB. However, BLEB has some unfavourable chemical properties, e.g., photoinstability, phototoxicity and cytotoxicity, high fluorescence, low water solubility (only 10.9±0.9 µM), and the like. Because of these unfavourable properties, investigators are biased against the application of BLEB and its derivative PAB. So far, there has been no report on the use of BLEB and/or PAB for the cryopreservation and resuscitation of cardiomyocytes, especially human cardiomyocytes.

However, the inventors of this application surprisingly found that BLEB and PAB can unexpectedly maintain the original morphology and survival rate of cardiomyocytes after cryopreservation and resuscitation. On this basis, the inventors of this application use BLEB and/or PAB or a physiologically acceptable salt thereof as the key components in a cryopreservation composition, and combine them with other specific components to implement cryopreservation and resuscitation, thus well solving the above-mentioned problems to be solved by the present invention, thereby completing the present invention.

A first aspect of the present invention relates to a composition, comprising BLEB and/or PAB and a cryoprotective agent.

In one embodiment, when used alone or in combination, in the composition of the present invention, the concentration of BLEB is 1 to 50 µM, preferably 3 to 20 µM, more preferably 5 to 15 µM, particularly preferably 8 to 12 µM, and more particularly preferably about 10 µM; and the concentration of PAB is 1 to 100 µM, preferably 3 to 60 µM, more preferably 5 to 50 µM, and particularly preferably about 10 to 20 µM.

The term "about" used in the context of this description means a range that fluctuates 10% above and below the cited value. For example, if the concentration of a component is about 5 mM, it means that its concentration is 4.5 to 5.5 mM; and if the concentration of a component is in the range of about 5 to 10 mM, it means that its concentration is in the range of 4.5 to 11 mM.

As described above, the cryoprotective agent used in the present invention can reduce the formation of intracellular ice crystals under low-temperature conditions, and reduce the concentration of electrolytes in the unfrozen solution, thereby inhibiting damage to cells. In one embodiment, the cryoprotective agent in the composition of the present invention is selected from the group consisting of polyvinyl pyrrolidone (PVP), hydroxyethyl starch (HES), dimethyl sulfoxide (DMSO), ficoll and dextran cryoprotective agents, or any combination thereof. In a particularly preferred embodiment, the cryoprotective agent is hydroxyethyl starch (HES), dimethyl sulfoxide (DMSO) or a combination thereof. When used alone or in combination, the concentration of HES is 20 to 100 mg/ml, preferably 25 to 60 mg/ml, more preferably 30 to 40 mg/ml, and more preferably about 36 mg/ml; and the concentration of DMSO is 1 to 30 vol %, more preferably 3 to 20 vol %, more preferably 5 to 15 vol %, more preferably 8 to 12 vol %, and more preferably about 10 vol %.

In one embodiment, the composition of the present invention further optionally comprises one or more components selected from the group consisting of an energy component, a metabolic regulator, an acid-base regulator, and an isotonic agent.

The composition of the present invention optionally comprises an energy substance, which provides necessary energy reserves for the cells during cryopreservation and resuscitation. In a preferred embodiment, the energy substance is glucose with a concentration of, for example, 5 to 50 mM, preferably 10 to 30 mM, more preferably 20 to 25 mM, and particularly preferably about 22 mM.

The composition of the present invention optionally comprises a metabolic regulator, e.g., adenosine, allopurinol, reduced glutathione, taurine, sodium pyruvate, insulin, creatine, β-taurine, L-carnitine, and the like, which helps cells regulate energy metabolism (e.g., glucose metabolism) during cryopreservation and resuscitation. In a preferred embodiment, the metabolic regulator is adenosine, allopurinol, reduced glutathione, taurine, creatine, or any combination thereof. When used alone or in combination, the concentration of adenosine is 0.1 to 20 mM, preferably 1 to 10 mM, more preferably 3 to 8 mM, and particularly preferably about 5 mM; the concentration of allopurinol is 0.1 to 5 mM, preferably 0.5 to 2 mM, more preferably about 0.8 to 1.5 mM, and particularly preferably about 1 mM; the concentration of reduced glutathione is 0.5 to 10 mM, preferably 1 to 8 mM, more preferably 2 to 5 mM, and particularly preferably about 3 mM; the concentration of taurine is 5 to 50 mM, preferably 10 to 30 mM, more preferably 15 to 25 mM, and particularly preferably about 20 mM; and the concentration of creatine is 0.5 to 20 mM, preferably 1 to 10 mM, more preferably 3 to 8 mM, and particularly preferably about 5 mM.

The composition of the present invention optionally comprises an acid-base regulator, comprising a buffer substance for maintaining the pH value of the composition stable, e.g., 4-hydroxyethyl piperazine ethanesulfonic acid (HEPES), and an acid-base substance for directly regulating the pH value of the composition, e.g., potassium hydroxide, sodium hydroxide, and the like. In a preferred embodiment, the acid-base regulator is HEPES. In another preferred embodiment, the acid-base regulator is a combination of HEPES, potassium hydroxide and sodium hydroxide. When used alone or in combination, the concentration of HEPES is 0.5 to 10 mM, preferably 1 to 8 mM, more preferably 3 to 6 mM, and particularly preferably about 5 mM; and the concentration of potassium hydroxide or sodium hydroxide (or the total concentration thereof) is, for example, 10 to 200 mM, preferably 50 to 150 mM, more preferably 80 to 120 mM, and particularly preferably about 100 mM. In addition, the final pH value of the composition is adjusted to 7.0 to 7.8, preferably 7.2 to 7.6, more preferably 7.3 to 7.5, and particularly preferably about 7.4, by using an acid-base regulator. With reference to the above-mentioned components and their concentration ranges, those skilled in the art can select the acid-base regulator to be used and its amount according to specific conditions.

The composition of the present invention optionally comprises an isotonic agent, which is a substance that maintains the osmotic pressure of the composition to ensure moisture and electrolyte balance in the cells. In a preferred embodiment of this aspect, the isotonic agent is magnesium sulfate (e.g., a hydrate of magnesium sulfate, e.g., a heptahydrate thereof), potassium dihydrogen phosphate, calcium chloride, or a combination thereof. When used alone or in combination, the concentration of magnesium sulfate is 1 to 20 mM, preferably 2 to 10 mM, more preferably 3 to 8 mM, and particularly preferably about 5 mM; the concentration of potassium dihydrogen phosphate is 5 to 100 mM, preferably 10 to 50 mM, more preferably 20 to 30 mM, and particularly preferably about 25 to 26 mM; and the concentration of calcium chloride is 0.5 to 5 mM, preferably 1 to 3 mM, more preferably 1.5 to 2 mM, and particularly preferably about 1.8 mM.

It should be noted that some components may have more than one role in the cryopreservation formulation of the present invention. For example, although potassium dihydrogen phosphate is listed as an isotonic agent in this description, it also has the function of pH adjustment and buffering, and can also be regarded as an acid-base regulator. Similarly, although calcium chloride is listed as a metabolic regulator, and glucose is listed as an energy substance in this description, these substances also play a role in maintaining osmotic pressure (i.e., isotonicity), and can also be regarded as an isotonic agent, and so on.

The composition of the present invention may further optionally comprise other components known in the art or commonly used for cell preservation. For example, the composition of the present invention may comprise an inhibitor of apoptosis, thereby increasing the survival rate of the cells during cryopreservation and resuscitation. For example, the inhibitor of apoptosis can be Z-VAD-FMK, Emericase, Belnacasan, or a combination thereof.

In one embodiment, the composition of the present invention comprises the following components: BLEB and/or PAB (or a physiologically acceptable salt thereof), as well as hydroxyethyl starch, DMSO, glucose, creatine, adenosine, allopurinol, reduced glutathione, taurine, 4-hydroxyethyl piperazine ethanesulfonic acid, magnesium sulfate, potassium dihydrogen phosphate, and calcium chloride. Optionally, the composition of the present invention may further comprise other acid-base regulators, e.g., potassium hydroxide, sodium hydroxide, and the like.

In a preferred embodiment, the composition of the present invention comprises the following components: 1 to 50 µM BLEB and/or 1 to 100 µM PAB, as well as 20 to 100 mg/ml hydroxyethyl starch, 1 to 30 vol % DMSO, 5 to 50 mM glucose, 0.5 to 20 mM creatine, 0.1 to 20 mM adenosine, 0.1 to 5 mM allopurinol, 0.5 to 10 mM reduced glutathione, 5 to 50 mM taurine, 0.5 to 10 mM 4-hydroxyethyl piperazine ethanesulfonic acid, 1 to 20 mM magnesium sulfate, 5 to 100 mM potassium dihydrogen phosphate, and 0.5 to 5 mM calcium chloride. Optionally, the composition of the present invention may further comprise other acid-base regulators, e.g., 10 to 200 mM potassium hydroxide and/or an appropriate amount of sodium hydroxide, to adjust the final pH value of the composition to 7.0 to 7.8.

In a more preferred embodiment, the composition of the present invention comprises the following components: 3 to 20 µM BLEB and/or 3 to 60 µM PAB, as well as 25 to 60 mg/ml hydroxyethyl starch, 3 to 20 vol % DMSO, 10 to 30 mM glucose, 1 to 10 mM creatine, 1 to 10 mM adenosine, 0.5 to 2 mM allopurinol, 1 to 8 mM reduced glutathione, 10 to 30 mM taurine, 1 to 8 mM 4-hydroxyethyl piperazine ethanesulfonic acid, 2 to 10 mM magnesium sulfate, 10 to 50 mM potassium dihydrogen phosphate, and 1 to 3 mM calcium chloride. Optionally, the composition of the present invention may further comprise other acid-base regulators, e.g., 50 to 150 mM potassium hydroxide and/or an appropriate amount of sodium hydroxide, to adjust the final pH value of the composition to 7.2 to 7.6.

In a particularly preferred embodiment, the composition of the present invention comprises the following components: 5 to 15 µM (preferably 8 to 12 µM, and more preferably about 10 µM) BLEB and/or 5 to 50 µM (preferably about 10 to 20 µM) PAB, as well as 30 to 40 mg/ml hydroxyethyl starch, 5 to 15 vol % DMSO, 20 to 25 mM glucose, 3 to 8 mM creatine, 3 to 8 mM adenosine, 0.8 to 1.5 mM allopurinol, 2 to 5 mM reduced glutathione, 15 to 25 mM taurine, 3 to 6 mM 4-hydroxyethyl piperazine ethanesulfonic acid, 3 to 8 mM magnesium sulfate, 20 to 30 mM potassium dihydrogen phosphate, and 1.5 to 2 mM calcium chloride. Optionally, the composition of the present invention may further comprise other acid-base regulators, e.g., 80 to 120 mM potassium hydroxide and/or an appropriate amount of sodium hydroxide, to adjust the final pH value of the composition to 7.3 to 7.5.

In one embodiment, the composition of the present invention is used as a reagent for the cryopreservation of cardiomyocytes from mammals including, but not limited to, mice, rats, dogs, monkeys, and human beings. In a preferred embodiment, the composition of the present invention is used as a reagent for the cryopreservation of human cardiomyocytes.

Another aspect of the present invention relates to a cardiomyocyte cryopreservation kit, comprising any of the compositions above. In one embodiment, the body of the cryopreservation kit is made of a low-temperature resistant material to ensure that no damage will occur during freezing and rewarming as a container for holding the composition. In one embodiment, the cryopreservation kit is a gradient cooling kit. In one embodiment, a cryopreservation tube for containing the composition is placed in the cryopreservation kit (e.g., a gradient cooling kit produced by Corning Inc., USA).

Another aspect of the present invention relates to a method for the cryopreservation of mammalian cardiomyocytes using any of the compositions above. In one embodiment, the cryopreservation method comprises the steps of:

Pre-cooling step: The composition of the present invention is pre-cooled at 0 to 5° C. (e.g., 4° C.), wherein cardiomyocytes can optionally be recalcified to maintain their activity;

Transfer step: The cardiomyocytes placed in a medium are centrifuged and the supernatant is removed, and the cell pellets obtained by centrifugation are suspended in the pre-cooled composition, so that the density of the cells in the composition is, for example, $0.5 \times 10^6$/ml to $5 \times 10^6$/ml, preferably $1 \times 10^6$/ml to $2 \times 10^6$/ml, and then the suspension is transferred to a cryopreservation container (e.g., to a cryopreservation tube placed in a cryopreservation kit); and Cooling step: The temperature is slowly lowered to the target temperature (e.g., −80° C.), wherein the temperature can be lowered by means of gradient cooling, and the gradient is, for example, about −0.8 to −2° C./min, preferably about −1 to −1.2° C./min. It should be noted that the cooling rate should not be too fast, otherwise the cells will easily die.

After the cells are cryopreserved for a period of time (e.g., 1 to 72 hours, preferably 12 to 48 hours) by the method above, the cells in the frozen state can be placed in a constant temperature water bath at an appropriate temperature (for example, human cardiomyocytes should be placed in a constant temperature water bath at human body temperature, i.e., 37° C.) to resuscitate the cells, and then the resuscitated cells are preserved in a known medium (e.g., one or more media selected from M199 series, MEM series, and DMEM series) by a known method for subsequent use. In one embodiment, the medium further comprises an appropriate amount of a serum (e.g., fetal bovine serum) or a serum protein (e.g., bovine serum albumin) and an antibiotic (e.g., penicillin and/or streptomycin). In a preferred embodiment, the medium further comprises BLEB and/or PAB. When used alone or in combination, the volume fraction of the serum above (e.g., fetal bovine serum) in the medium may be 1% to 20%, preferably 2% to 15%, more preferably 3% to 12%, and particularly preferably about 5% to 10%; the concentration of the serum protein above (e.g., bovine serum albumin) in the medium may be 0.1 to 10 g/ml, preferably 0.2 to 5 g/ml, more preferably 0.3 to 1 g/ml, and particularly preferably about 0.5 g/ml; the concentration of penicillin in the medium may be 10 to 500 U/ml, preferably 20 to 400 U/ml, more preferably 50 to 300 U/ml, and particularly preferably about 100 to 200 U/ml, about 100 U/ml or about 200 U/ml; the concentration of streptomycin in the medium may be 10 to 500 µg/ml, preferably 20 to 400 µg/ml, more preferably 50 to 300 µg/ml, and particularly preferably about 100 to 200 µg/ml, about 100 µg/ml or about 200 µg/ml; the concentration of BLEB in the medium may be 1 to 50 µM, preferably 3 to 20 µM, more preferably 5 to 15 µM, particularly preferably 8 to 12 µM, and more particularly preferably about 10 µM; and the concentration of PAB in the medium may be 1 to 100 µM, preferably 3 to 60 µM, more preferably 5 to 50 µM, and particularly preferably about 10 to 20 µM.

More specific embodiments of the present invention will be illustratively explained by the following examples, but it should be recognized that these examples are not intended to limit the scope of the present invention.

EXAMPLES

Example 1: Cryopreservation of Cardiomyocytes

Firstly, a cell cryopreservation reagent was prepared according to the following formula:

| Component | Concentration | Component | Concentration |
|---|---|---|---|
| HES | 36 mg/ml | Reduced glutathione | 3 mM |
| DMSO | 10 v/v % | Taurine | 20 mM |
| Potassium dihydrogen phosphate | 25.8 mM | Creatine | 5 mM |
| Magnesium sulfate heptahydrate | 5 mM | Glucose | 22 mM |
| Calcium chloride | 1.8 mM | HEPES | 5 mM |
| BLEB | 10 µM | Potassium hydroxide | 100 mM |
| Adenosine | 5 mM | Sodium hydroxide | q.s. to pH 7.4 |
| Allopurinol | 1 mM | Deionized water | |

Note:
The osmotic pressure was about 300 mOsm/kg.

The prepared cryopreservation reagent, gradient cooling kit (produced by Corning Inc., USA), and cryogenic centrifuge (Eppendorf centrifuge 5804R, Germany) were pre-cooled to 4° C. in advance. The freshly isolated and collected cardiomyocytes were centrifuged (at 100×g, 4° C., for 1 minute), the supernatant was removed, the cell cryopreservation reagent was slowly added at a cell density of about 1×10⁶/ml, and the mixture was well blended by gentle pipetting. The cell suspension was transferred to a cell cryopreservation tube, placed in a 4° C. refrigerator, and then placed in a gradient cooling kit after standing for 15 minutes. The cooling kit was placed in a −80° C. refrigerator for gradient cooling, and transferred to −196° C. liquid nitrogen after 12 hours.

The human cardiomyocytes used in this example were collected from the left atrial appendage of three male patients (aged 51±4 years) who underwent mitral valvuloplasty, mitral valve replacement or coronary artery bypass grafting.

Example 2: Resuscitation of Cardiomyocytes

The water temperature of a constant temperature water bath (Shanghai Boxun, SSW-420-2S, China) was adjusted to 37° C. for preheating. A certain volume of medium was prepared at a volume ratio of 1:10 of the cell suspension to the medium. The medium comprised the following components: MEM-HEPES-GlutaMAX (Thermo, 42360032), 10 vol % fetal bovine serum (10099141C), 10 µM BLEB (Selleck, S7099), 100 U/ml penicillin, and 100 µg/ml streptomycin (Gibco, 15240062).

Next, the cryopreservation tube containing the cryopreserved cells that had been preserved for 60 hours in Example 1 was removed from the liquid nitrogen, and was quickly put into a constant temperature water bath at 37° C. and shaken with moderate intensity, and the cell suspension was thawed within about 1.5 minutes. An equal volume of the medium to the cell suspension was pipetted with a pipette (Eppendorf, Germany), slowly added to the cryopreservation tube, and well blended gently. Then, the entire cell suspension was transferred to the medium prepared in advance, and the pipette tip was extended under the liquid surface and gently dripped the cell suspension at about 2 to 4 drops per second. The mixture was well blended gently after dripping, and then placed in a centrifuge for centrifugation (at 100×g, 4° C., for 2 to 3 minutes). The supernatant was discarded, and the cell pellets were well pipetted gently with 1 to 2 ml of medium.

Figure 2:
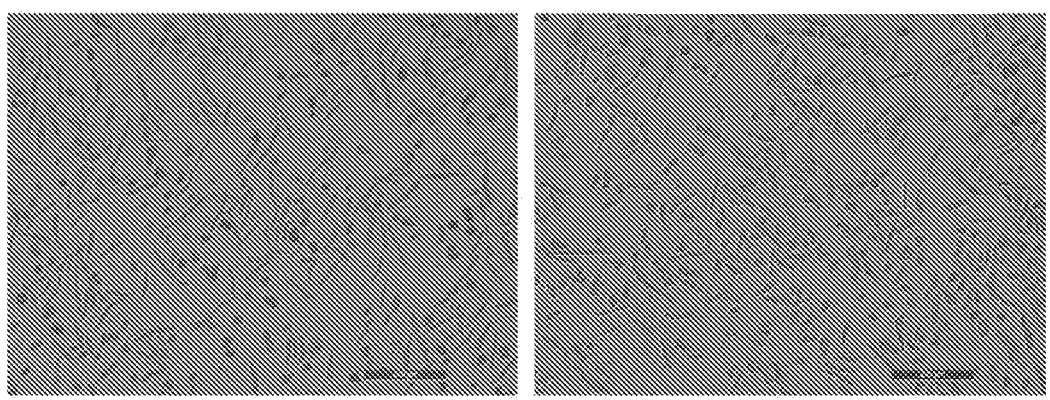
FIG. 2 show a comparison graph of the state of cardiomyocytes before and after the cryopreservation and resuscitation operations in Examples 1 to 2.
Figure 3:
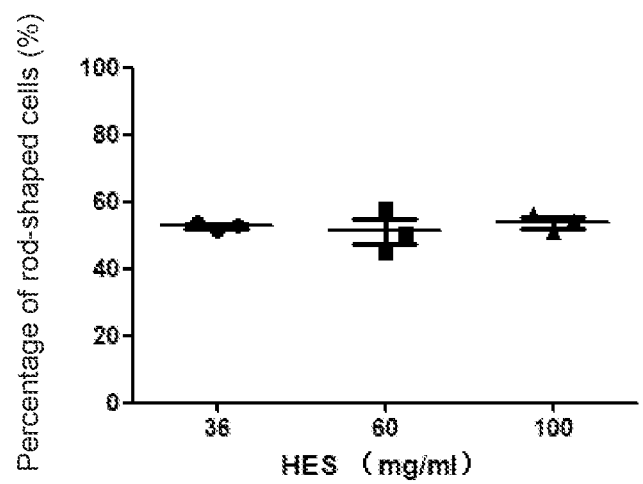
FIG. 3 shows the resuscitation rate of cardiomyocytes obtained in the case of cryopreservation and resuscitation using cryopreservation reagents containing HES with different concentrations in Example 3.

As shown in FIG. 1, human cardiomyocytes were counted before and after the cryopreservation and resuscitation operations in Examples 1 to 2, and the cell resuscitation rate (i.e., the ratio of the number of rod-shaped cells after cryopreservation and resuscitation to the number of cells before cryopreservation) was calculated to be 63.5±12.05%. In addition, it could be clearly seen under the microscope (Leica, DMI4000B, 10×) that the resuscitated cells basically maintained the cell morphology before cryopreservation (FIG. 2). The above results show that the cell cryopreservation reagent of the present invention can successfully cryopreserve and resuscitate cardiomyocytes, and maintain the cell morphology well.

Example 3: Effect of HES Concentration on Cryopreservation and Resuscitation Effect The effect of different concentrations of HES added to the cardiomyocyte cryopreservation reagent on the cryopreservation and resuscitation effect was studied through experiments. The experiment was performed in parallel in three groups, and the cardiomyocytes used were collected from the left atrial appendage of three male patients (aged 61±6 years) who underwent coronary artery bypass grafting. The concentrations of the cryopreservation reagents used were 36 mg/ml, 60 mg/ml, and 100 mg/ml, respectively, and the components and operation steps of other cryopreservation reagents were the same as those described in Examples 1 and 2. The rod-shaped cell rates obtained in the three groups of experiments were 52.69±1.44%, 51.09±6.49%, and 53.68±2.82%, respectively, indicating that the HES concentration has no significant effect on the resuscitation effect of cardiomyocytes.

Example 4: Comparison of Effects of BLEB and PAB

The purpose of this experiment was to investigate the effects of BLEB and PAB on cell survival rate and morphology during the ex vivo survival of cardiomyocytes, so as to predict the similarity of their roles during cryopreservation and resuscitation of cardiomyocytes.

10% fetal bovine serum, 100 U/ml penicillin and 100 µg/ml streptomycin were added to the M199 medium (purchased from Sigma Inc.), and the resulting medium was used as a basal medium. The experiments were divided into 6 groups, in which DMSO (as a control group), as well as 10 µM BLEB and 5 µM, 10 µM, 20 µM, and 50 µM PAB were added to the basal medium, respectively. The isolated human cardiomyocytes were divided into 6 groups, and the cells were plated on a 48-well cell culture plate coated with 200 µg/ml laminin in advance using 6 media, and the plate was placed and cultured in a cell incubator (with 5% $CO_2$, and a relative saturated humidity of 95%) at 37° C. for 7 days. The rod-shaped rate of cardiomyocytes was calculated, and the results are shown in FIG. 4.

Figure 4:
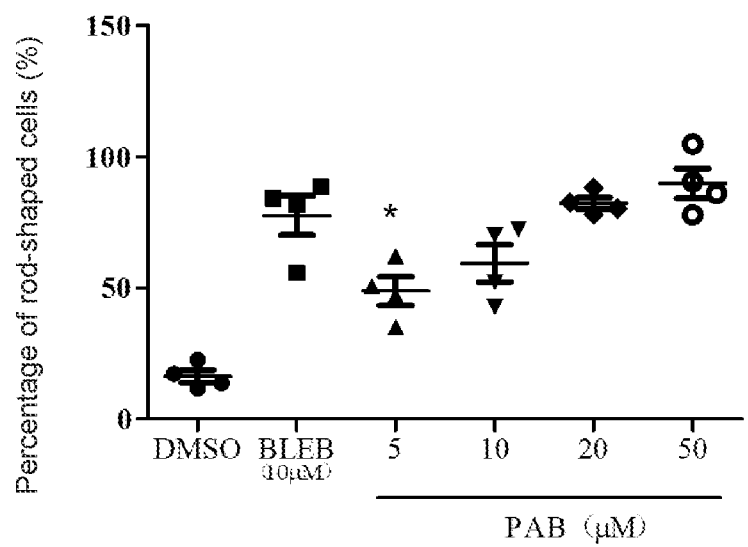
FIG. 4 is a graph showing the effect of BLEB and PAB on the rate of rod-shaped cardiomyocytes.

It can be seen from FIG. 4 that the 5-50 µM PAB group achieved effects close to or even better than the 10 µM BLEB group, that is, the effects of the two on the viability of human cardiomyocytes were roughly equivalent. Thus, it can be seen that PAB, which is a derivative of BLEB, can also achieve similar effects to BLEB in the process of cryopreserving and resuscitating cardiomyocytes using the method of the present invention.

The above-mentioned examples show that the cryopreservation reagent and cryopreservation method of the present invention can achieve a good survival rate and maintain the cell morphology well even for the human cardiomyocytes that are most difficult to cryopreserve and resuscitate.

The invention claimed is:

1. A cryopreservation composition, comprising the following components: 1 to 50 µM BLEB and/or 1 to 10 µM PAB or a physiologically acceptable salt thereof, as well as 20 to 100 mg/ml hydroxyethyl starch, 1 to 30 vol % DMSO, 5 to 50 mM glucose, 0.5 to 20 mM creatine, 0.1 to 20 mM adenosine, 0.1 to 5 mM allopurinol, 0.5 to 10 mM reduced glutathione, 5 to 50 mM taurine, 0.5 to 10 mM 4-hydroxyethyl piperazine ethanesulfonic acid, 1 to 20 mM magnesium sulfate, 5 to 100 mM potassium dihydrogen phosphate, and 0.5 to 5 mM calcium chloride:

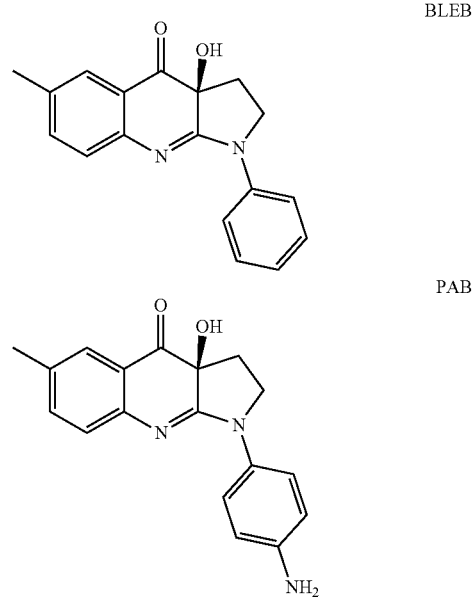

wherein the composition has a pH value of 7.0 to 7.8.

2. A method for cryopreserving mammalian cardiomyocytes, the method comprising adding mammalian cardiomyocytes to the cryopreservation composition of claim 1.

3. The method of claim 2, wherein the mammalian cardiomyocytes are human cardiomyocytes.

* * * * *